June 2, 1959 R. F. BAUM 2,889,458

NARROW BAND DISCRIMINATOR CIRCUIT

Filed Nov. 12, 1954 4 Sheets-Sheet 1

INVENTOR
RICHARD F. BAUM
BY Ernest Fanwick
ATTORNEY

INVENTOR
RICHARD F. BAUM
BY Ernest Fanwick
ATTORNEY

INVENTOR
RICHARD F. BAUM
BY Ernest Fanwick
ATTORNEY

June 2, 1959 R. F. BAUM 2,889,458

NARROW BAND DISCRIMINATOR CIRCUIT

Filed Nov. 12, 1954 4 Sheets-Sheet 4

INVENTOR
RICHARD F. BAUM
BY Ernest Fanwick
ATTORNEY

United States Patent Office 2,889,458

Patented June 2, 1959

2,889,458

NARROW BAND DISCRIMINATOR CIRCUIT

Richard F. Baum, New York, N.Y., assignor to International Telephone and Telegraph Corporation, Nutley, N.J., a corporation of Maryland Application November 12, 1954, Serial No. 468,194

4 Claims. (Cl. 250—31)

This invention relates to narrow band discriminator circuits and more particularly to a narrow band discriminator circuit for use with pulse modulated communication systems having a multiplicity of channels.

One of the most widely known narrow band discriminator circuits is the Ferris discriminator such as disclosed on page 275 of Electrical Communication, volume XXVI, 1949. The Ferris discriminator is used in systems for detection of short pulses of electromagnetic wave energy where there are a multitude of communication channels spaced so closely in frequency that the spectrum of the communicating pulse extends over a bandwidth greater than the channel spacing. In such situations the use of a very narrow band intermediate frequency (IF) amplifier becomes insufficient to insure suppression of reception of signals radiated on adjacent channels because part of the adjacent channel pulsed energy overlaps the frequency spectrum of the desired channel and thus is detected, amplified and received. On the other hand, when the Ferris discriminator circuit is utilized, it is preceded by an IF amplifier which has a bandwidth which is as broad as the pulse spectrum. The Ferris discriminator circuit provides a pulse of one polarity if the greater part of the pulse spectrum energy is located within the desired channel and a pulse of the opposite polarity if the majority of the pulse spectrum energy is located without the desired channel. Hence the Ferris discriminator circuit insures the rejection of adjacent channels by inversion of the pulse output polarity. The Ferris discriminator circuit, however, is difficult to design since it requires the attainment of an extremely high primary and secondary circuit Q. In addition the inductive coils used in the Ferris discriminator circuit tend to reduce the selectivity due to their high frequency loss and reception is often lost or distorted because the Ferris discriminator tuning will be misaligned or will drift with temperature variations.

One of the objects of this invention therefore is to relax the requirements upon the primary and secondary circuit Q while reducing the number of components in a narrow band discriminator circuit to a minimum while and yet obtain high gain.

Another object is to assure reception of the signal in the desired channel even in the case where misalignment or temperature drift would prevent such reception in the prior art discriminator circuits and to obtain a discriminator circuit output curve having increased selectivity compared with that attained with the known discriminator circuits.

The above-mentioned and other objects and features of this invention will become more apparent by reference to the following description taken in conjunction with the accompanying drawings, in which.

Figure 1:
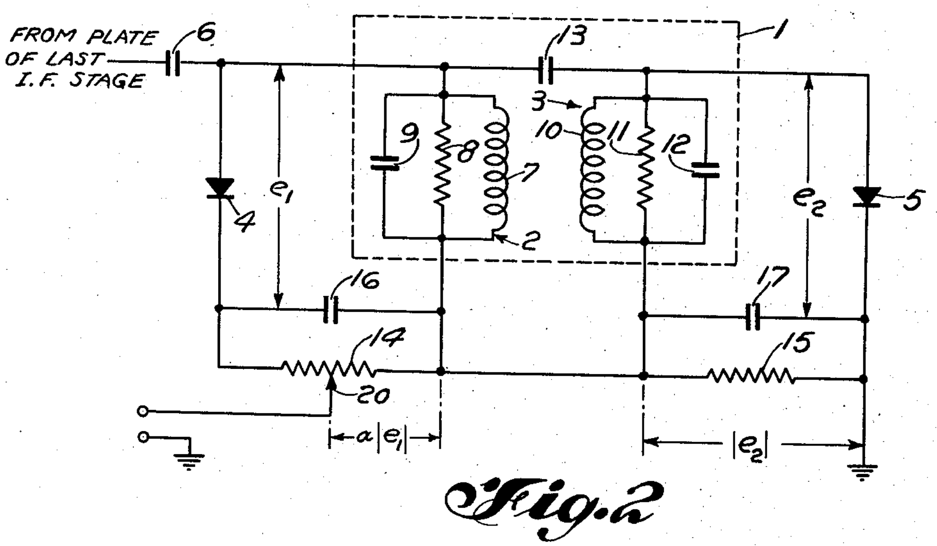
Fig. 1 (PRIOR ART)
Fig. 1 is a schematic circuit diagram of one embodiment of a Ferris discriminator known to the prior art.

Referring to Fig. 1 wherein one embodiment of a Ferris discriminator circuit known to the prior art is shown to comprise a discriminator network 1 having a primary and secondary tuned circuit 2 and 3 respectively and a pair of poled rectifier devices 4 and 5 which are connected to the primary and secondary tuned circuits 2 and 3. The plate current of the last IF ( intermediate frequency) stage in the IF amplifier is impressed through the coupling condenser 6 to the primary circuit 2 of the discriminator network 1. The tuned primary circuit 2 comprises an inductance 7, resistance 8 and capacitance 9 while the tuned secondary circuit comprises an inductance 10, resistance 11 and capacitance 12. The primary and secondary circuits 2 and 3 of the discriminator network 1 are coupled together through capacitive coupling 13.

The primary voltage $e_1$ and the secondary voltage $e_2$ are separately rectified by means of the rectifier devices 4 and 5, together with their respective load resistances 14 and 15 by-passed by condenser 16 and 17.

Figure 2:
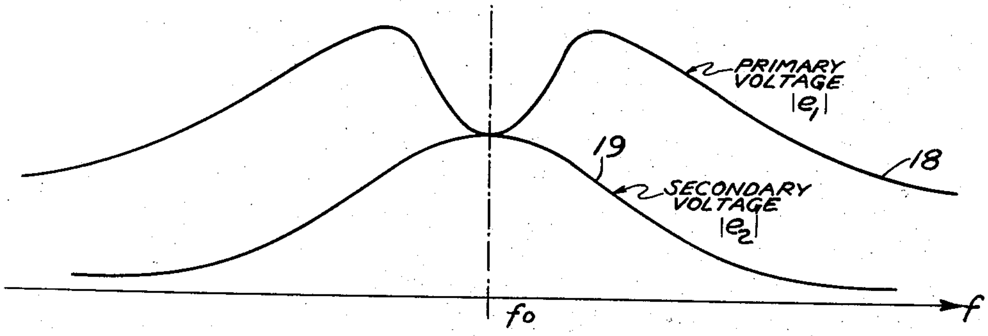
Fig. 2 is a graphic representation of the response curves of the primary and secondary circuits of the Ferris discriminator shown in Fig. 1.

Referring to Fig. 2, curve 18 represents the magnitude of the rectified voltage appearing across resistance 14 and curve 19 represents the magnitude of the rectified voltage appearing across load resistor 15, both voltage magnitudes being plotted as a function of frequency. The magnitude of the primary voltage 18 shows a minimum or dip in magnitude at the design frequency or center frequency, $f_0$, which represents the frequency of the channel desired to be received. This minimum or dip at the design center frequency $f_0$ is achieved through tight coupling between the primary and secondary circuits 2 and 3 and a high ratio of secondary to primary circuit Q. The curves shown in Fig. 2 are representative of a critical coupling and a ratio of secondary to primary Q equal to approximately three.

Resistor 15 is grounded at one end and connected at the opposite end to resistance 14. Due to the polarity of the rectifier devices 4 and 5 the discriminator circuit output voltage will be equal to the magnitude of the secondary voltage minus a fraction of the primary voltage. The fraction ($ae_1$) of the primary voltage which is subtracted from the secondary voltage is dependent upon the position of tap 20 along resistance 14. The tap is so chosen that a proper fraction ($ae_1$) of the primary voltage is subtracted from the secondary voltage.

Figure 3:
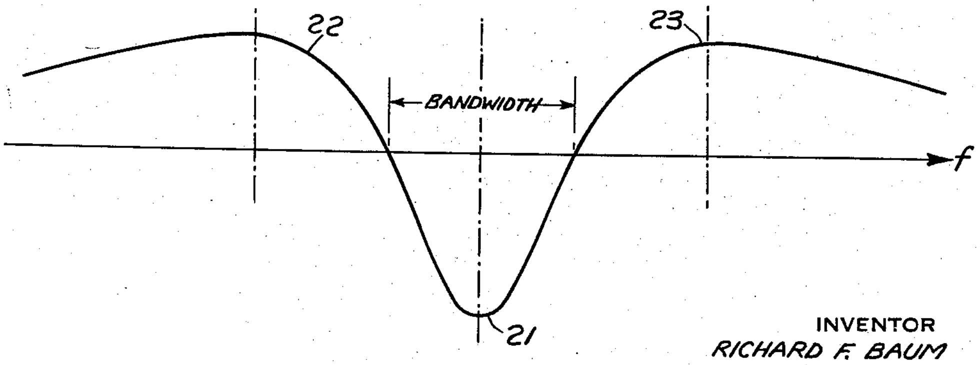
Fig. 3 is a graphic illustration of the output response curve of the circuit shown in Fig. 1.

Referring to Fig. 3, a graphic illustration of the output voltage response versus frequency is illustrated. The negative peak 21 appears in the neighborhood of the design center frequency $f_0$ and the positive peaks 22 and 23, of equal amplitude, appear in the neighborhood of the frequency of adjacent channels. The frequency interval between the points of zero output voltage is designated as the bandwidth of the discriminator.

The principal difficulty in the design of a narrow band Ferris discriminator lies in the attainment of a sufficiently high primary and secondary circuit Q. Due to the pulse nature of the signal, the rectifier time constants must be sufficiently short to insure rapid discharge of the condensers 16 and 17, thus imposing a heavy loading upon the primary and secondary circuits 2 and 3. In order to attain the required Q the capacity of condenser 9 and 12 must be large with subsequent loss in gain for the discriminator circuit.

It is also known that the polarity of the output voltage depends primarily upon the tuning of the secondary circuit 3. Thus, if due to temperature variations or misalignment or improper tuning, the secondary circuit 3 becomes untuned, then it is possible that the output voltage will reverse polarity, rejecting the desired channel and receiving the adjacent channels.

Figure 4A:
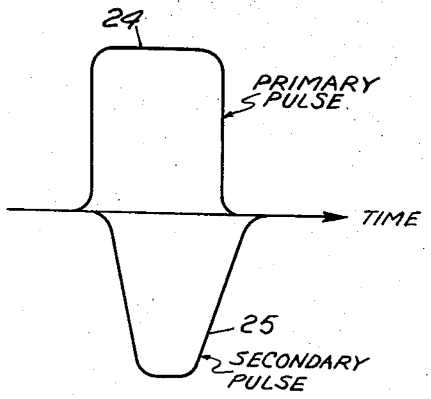
Figs. 4A and 4B are graphic illustrations of the pulse waveforms obtained in the circuit of Fig. 1.

Because of the broad aspect of the primary response curve compared with the relatively narrow response curve of the secondary, a short square input pulse will appear after rectification as an almost square pulse across resistance 14, as shown by pulse 24 in Fig. 4A. However, the pulse appearing across resistance 15 will be slightly delayed having a longer rise and delay time as shown by curve 25 in Fig. 4A. Hence, when the two pulses 24 and 25 appearing across resistance 14 and resistance 15, respectively, are added to yield an output pulse the output pulse will be irregular at the leading and trailing edge as shown by curve 26 in Fig. 4B. The improved discriminator circuit of this invention partly or completely prevents this effect by passing the primary demodulated pulse through a low-pass filter before it is added to the secondary demodulated pulse.

Figure 4B:
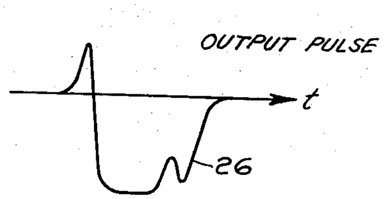
Figure 5:
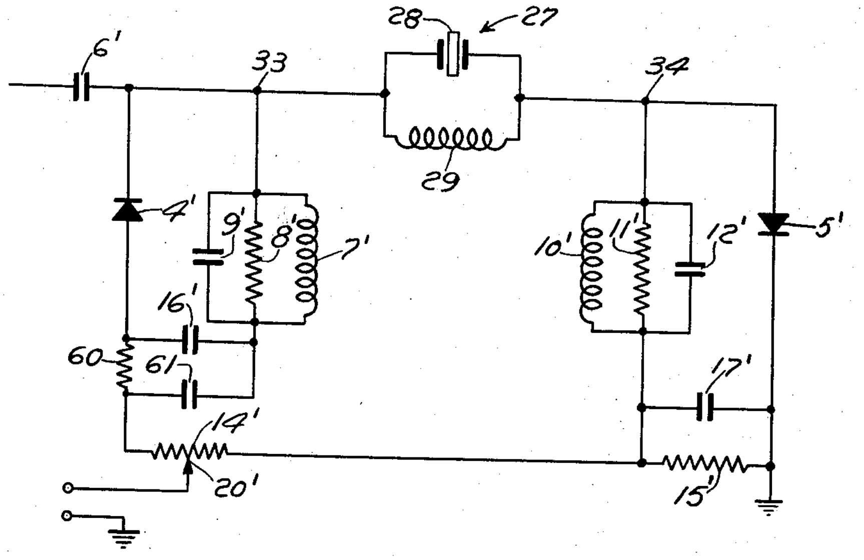
Fig. 5 is a schematic circuit diagram of one embodiment of an improved narrow band discriminator network in accordance with the principles of my invention.
Figure 6:
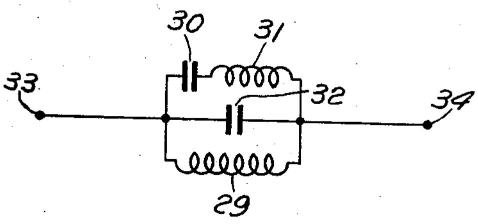
Fig. 6 is an equivalent circuit diagram of the coupling circuit shown in Fig. 5.
Figure 7:
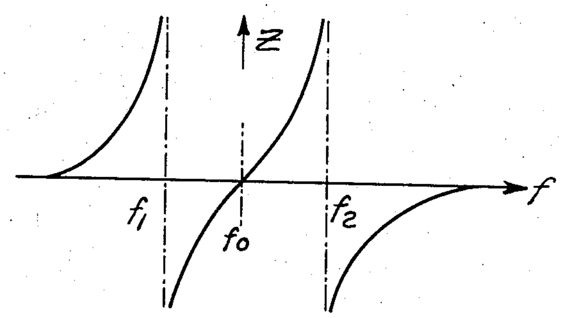
Fig. 7 is a graphic illustration of the frequency response curve of the coupling circuit used in Fig. 5.

Referring now to Fig. 5, an improved narrow bandwidth discriminator circuit in accordance with the principles of my invention is shown wherein the coupling capacitor 13 of the prior art Ferris discriminator circuit is replaced by the network 27 which comprises a quartz crystal 28 in parallel with an inductance 29. The electrical equivalent of the quartz crystal coupling network shown in Fig. 5 is shown in Fig. 6 wherein capacitor 30 and inductance 31 represent a series resonant circuit of the crystal and capacitor 32 is equal to the shunt capacity of the crystal. When the crystal is cut to resonate at the center or design frequency $f_0$ and when inductance 29 and capacitance 32 also resonate at the design frequency, then the coupling circuit represents, between its terminals 33 and 34, an impedance as shown in Fig. 7. The ratio of the center frequency $f_0$, where the impedance is equal to zero, to the difference of the two frequencies $f_1$ and $f_2$ where the impedance is infinite is equal to the square root of the ratio of capacitor 30 to capacitor 32 which is in the order of several thousand and hence the bandwidth of the circuit is very narrow. The unidirectional output of the primary circuit is passed through a delay caused by resistor 60 and capacitor 61 to overcome the effects described in connection with Figs. 4A and 4B.

Figure 8:
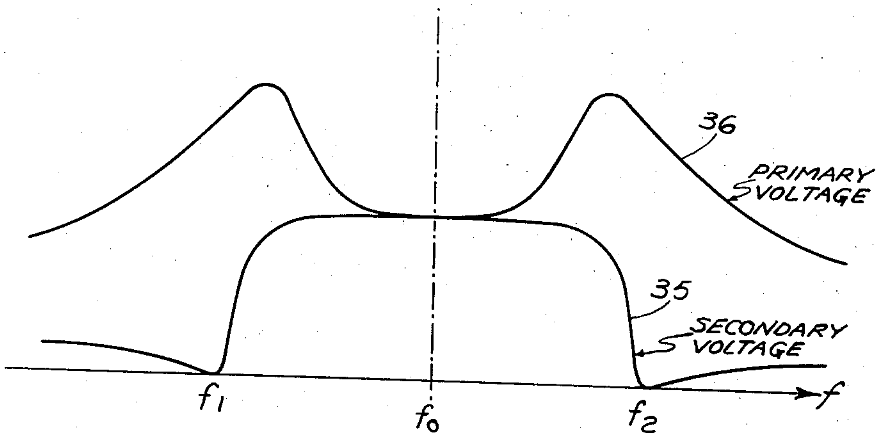
Fig. 8 is a graphic illustration of the primary and secondary circuit response curves of the discriminator circuit shown in Fig. 5.

Referring to Fig. 8, curve 35 represents the magnitude of the secondary circuit voltage response versus frequency and curve 36 represents the magnitude of the primary voltage response versus frequency. Referring back to the circuit of Fig. 5, at the resonant frequency $f_0$ of the crystal, the impedance of the shunting circuit is zero and the primary and secondary tuned circuits 2 and 3 are practically shunted. Thus, the primary voltage $e_1$ equals the secondary voltage $e_2$ regardless of whether the circuit components are detuned and the proper polarity of the output pulse is assured for the desired channel. It is also clear that when the impedance of the coupling circuit is infinite, at $f_1$ and $f_2$, no power is transmitted to the secondary tuned circuit 3 and hence the magnitude of the secondary circuit voltage curve 35 shows a zero at the adjacent frequency whereas the magnitude of the primary circuit voltage curve 36 is at or near its maximum. Thus the peaks of the bi-modal curve 36 occur at or near the zeros of curve 35 which is substantially flat topped between the bi-modal peaks. The bandwidth of the magnitude of the secondary voltage curve is mainly determined by the coupling network whereas the primary and the secondary circuit Q mainly affects the shape of the output voltage beyond its cut-off frequencies. The dissipation in inductance 29 mainly causes a rounding off of the response curve 35 in the vicinity of its zeros.

Figure 9:
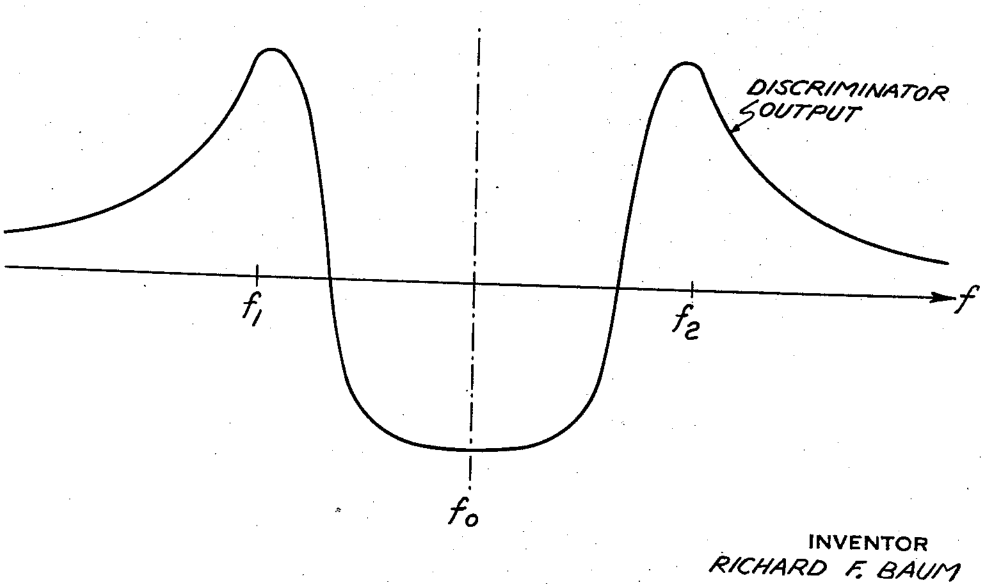
Fig. 9 is a graphic illustration of the output response curve for the discriminator circuit shown in Fig. 5; and, Fig. 10 is a schematic circuit diagram of an alternate embodiment of an improved narrow band discriminator circuit in accordance with the principles of my invention.

Fig. 9 illustrates the resulting output curve of the improved narrow bandwidth discriminator circuit of this invention. It should be noted that the output response curve of Fig. 9 has a definitely flatter bottom with increased steepness at the crossover points when compared with the output curve of the prior art Ferris discriminator circuit shown in Fig. 3.

Figure 10:
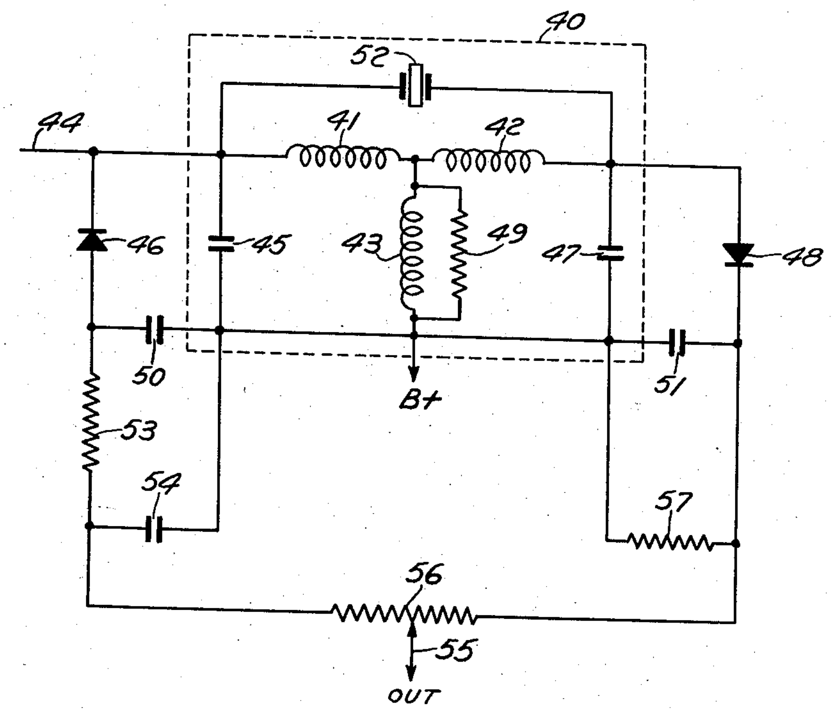

Referring to Fig. 10 of this invention, a preferred embodiment of the improved narrow bandwidth discriminator circuit of my invention which maintains all the advantages of the circuit previously described in connection with Fig. 5 and which will completely compensate for the dissipation of the inductances and allow a reduction in the number of circuit components is shown therein.

The discriminator circuit 40 may be recognized by those skilled in the art of filter design as the "bridged-T" equivalent of the discriminator network described in conjunction with the circuit shown in Fig. 5. The plate of the last IF amplifier stage preceding discriminator obtains its B+ potential through coils 43 and 41 over line 44. The B+ source is at ground potential for all RF currents. Capacitor 45 represents the capacity of the tube of the last IF stage plus the shunt capacity of the rectifier device 46 whereas capacitor 47 represents the shunt capacity of the rectifier device 48 plus an additional capacity to restore symmetry to the circuit.

Capacitors 45 and 46 are resonated by means of the T arrangement of the three coils 41, 42 and 43 of which only 41 and 42 need be high Q coils, 43 being a low Q inductance. Inductances 41 and 42 may be replaced by a single center tapped coil if so desired. Resistance 49 is provided to allow compensation for the coil losses in inductances 41 and 42. Through the proper choice of resistance 49 the output voltage of the network within the pass band can be made independent of coil losses. The Q of inductances 41 and 42 must be kept high in order to achieve satisfactory attenuation of the output voltage of the secondary circuit outside the pass band and thus it can be seen that the only high Q inductances that the network contains are coils 41 and 42.

The primary voltage and the secondary voltage are independently rectified by rectifier devices 46 and 48 connected in opposite polarity and the rectified voltages appear across by-pass capacitors 50 and 51, respectively. The load reflected into the tuned circuits by the rectifying diodes can be made equal to the impedance into and out of which the discriminator circuit is supposed to work in almost all cases, without the need for adding additional capacity to capacitors 45 or 47 or across the crystal 52 and this insures maximum gain since the circuit capacities can be kept at a minimum.

Resistance 53 and capacitance 54 constitute the simplest form of low-pass filter for the primary demodulated pulse and is inserted before the primary pulse is added to the secondary pulse in order to compensate for the effects described in connection with Figs. 4A and 4B. Part of the filtered voltage as determined by tap 55 on resistance 56 is added to the rectified voltage output of the secondary circuit by means of the resistance 56 which contains a tap point T for the discriminator output connection. The polarity of the rectifier devices 46 and 48 permit a continuous path for D.-C. current across inductances 41, 42, resistance 53 and 56 and if desired the resistance 57 may be omitted entirely without any detrimental effect.

While I have described above the principles of my invention in connection with specific apparatus, it is to be clearly understood that this description is made only by way of example and not as a limitation to the scope of my invention as set forth in the objects thereof and in the accompanying claims.

I claim:

1. A narrow bandwidth frequency discriminator circuit comprising a source of signals, a first resonant circuit coupled to said source and relatively broadly tuned to a given frequency, a second resonant circuit relatively broadly tuned to said given frequency, a circuit substantially series resonant at said given frequency coupling together said first and second resonant circuits, means coupled to said first circuit and developing a first unidirectional response voltage representative of the response of said first circuit to signals at said given frequency, means coupled to said second circuit for developing a second unidirectional response voltage having a polarity opposite to said first unidirectional response voltage and representative of the response of the said second circuit to the signals coupled from said first circuit, means for combining said first and second unidirectional voltages, said combining means further includes means to time delay said first unidirectional response voltage prior to said combining.

2. A frequency discriminator according to claim 1 wherein said series resonant coupling circuit comprises a piezo-electric device resonant at said given frequency and an inductance element in shunt relation to said piezo-electric device.

3. A frequency discriminator according to claim 1, wherein means are provided to obtain a fraction of said delayed first unidirectional response voltage and wherein said combining means combines said fractional voltage and said second unidirectional response voltage.

4. A narrow bandwidth frequency discriminator circuit comprising a plurality of inductance elements disposed in T relationship, an input circuit including a first inductance element forming at least a part of one series arm of said T, a second inductance element forming at least a part of the shunt arm of said T and a first capacitive element coupled across said series arm and said shunt arm, an output circuit including a third inductance element forming at least a part of the other series arm of said T, and a second capacitive element coupled across said other series arm and said shunt arm, a piezo-electric device resonant at a given frequency coupled across the inductance elements of both series arms of said T, means coupled to said input circuit for developing a first unidirectional response voltage representative of the response of said input circuit to signals at said given frequency, means coupled to said output circuit for developing a second unidirectional response voltage having a polarity opposite to said first unidirectional response voltage and representative of the response of said second circuit to the signals coupled from said first circuit and means for combining said first and second unidirectional voltages, said combining means further includes means for delaying said first unidirectional response voltage a predetermined amount of time and means for obtaining a fraction of said delayed unidirectional response voltage and combining means for algebraically adding said fraction of said first unidirectional response voltage and said second unidirectional response voltage.

References Cited in the file of this patent

UNITED STATES PATENTS

| | | |
|---|---|---|
| 2,045,991 | Mason | June 30, 1936 |
| 2,204,574 | Crosby | June 18, 1940 |
| 2,204,702 | Rust | June 18, 1940 |
| 2,244,022 | Rust et al. | June 3, 1941 |
| 2,425,922 | Crosby | Aug. 19, 1947 |
| 2,771,552 | Lynch | Nov. 20, 1956 |

OTHER REFERENCES

Dodington: "Crystal Control . . . ," Electrical Communication, vol. 26, page 275, December 1949.